United States Patent Office 3,792,120
Patented Feb. 12, 1974

3,792,120
STABILIZED POLYPHENYLENE ETHER
COMPOSITIONS
Robert M. Summers, Arlington, Mass., and Klaus E.
Holoch, Roxheim/Pfalz, Germany, assignors to General Electric Company
No Drawing. Filed Oct. 12, 1971, Ser. No. 188,428
Int. Cl. C08g 51/60, 43/00, 43/02
U.S. Cl. 260—874
17 Claims

ABSTRACT OF THE DISCLOSURE

There are provided stabilized compositions consisting of a major proportion of a thermoplastic resin having a polyphenylene ether component and a minor proportion of a stabilizer consisting of an N,N,N′,N″-tetrasubstituted arylphosphonic diamide, alone, or optionally combined with a boron compound.

This invention relates to thermoplastic compositions containing polyphenylene ethers and more particularly to the stabilization of such compositions with a stabilizing system selected from compounds containing phosphorus-nitrogen bonds, alone, or in combination with compounds containing boron-oxygen bonds.

BACKGROUND OF THE INVENTION

It is known that the polyphenylene ethers and, particularly, the 2,6-dialkyl substituted polyphenylene ethers, are somewhat unstable under the influence of heat and light, exposure causing the resin to become dark colored, brittle and undesirable for many uses. The cause of the degradation is not fully understood, but is believed to be due, in part, to the presence of hydroxyl groups on the polymer chain, a sensitivity to oxygen containing atmospheres and the degradative effects of traces of impurities present in the resin composition.

The term "polyphenylene ether" includes the polymers disclosed and claimed in Hay, U.S. Pats. 3,306,874 and 3,306,875, and in Stamatoff, U.S. Pats. 3,257,357 and 3,257,358. They are prepared by the oxidative coupling of a phenolic compound, preferably in an inert solvent and in the presence of a complex catalyst formed from a copper salt and an amine.

Illustrative polyphenylene ethers are members of a family embraced by Formula I:

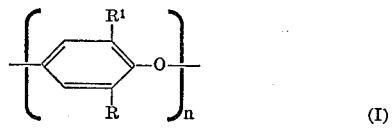

(I)

wherein R and $R^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and $n$ is a whole integer of at least about 50. Preferably the R and $R^1$ groups will be hydrocarbon alkyl of from 1 to 8 carbon atoms. Especially preferably R and $R^1$ are each methyl. Such a compound is known as poly(2,6-dimethyl-1,4-phenylene)ether.

The term "thermoplastic resin composition having a normally unstable polyphenylene ether component" contemplates such polyphenylene ethers alone and the various copolymers, interpolymers and blends of polyphenylene ethers formed by interpolymerizing or blending the polyphenylene ethers with other monomers or polymers, such as the polyolefins, polystyrenes, polycarbonates and the like, wherein the polyphenylene ether is present in an amount sufficient to adversely affect the properties of the polymer composition due to the influence of heat and light.

One important such composition comprises a combination of polyphenylene ether and a styrene resin. Such compositions, which possess many of the desirable advantages of both the polyphenylene ether and the styrene resin, are disclosed and claimed in Cizek, U.S. Pat. 3,383,-435. The most useful thermoplastic resin compositions of this type contain from about 20 to about 80, preferably from about 40 to about 60, parts by weight of said polyphenylene ether and from about 80 to about 20, preferably from about 60 to about 40, parts by weight of said polystyrene resin. The polystyrene resin will in general have at least 25% by weight of the repeating units derived from a monomer having Formula II:

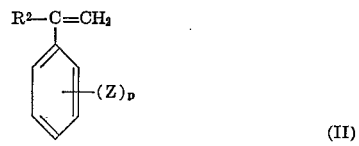

(II)

wherein $R^2$ is hydrogen, (lower)alkyl or halogen, Z is vinyl, halogen or (lower)alkyl; and $p$ is 0 or a whole number of from 1 to 5. Included in this family of resins will be homopolystyrene and polychlorostyrene and rubber modified polystyrenes, and styrene acrylonitrile copolymers, styrene-acrylonitrile-alpha-alkyl styrene terpolymers, styrene-acrylonitrile-butadiene terpolymers, poly-alpha-methylstyrene, copolymers of ethylvinyl benzene and divinyl benzene and the like. The most useful such compositions are those in which the polystyrene resin component is either homopolystyrene or a rubber modified (blended or grafted) high impact polystyrene, the rubber being, for example, a polybutadiene, polyisoprene or rubbery copolymer of butadiene and styrene. Polyphenylene ether components in such compositions are also known to adversely affect their properties under the influence of heat and light.

Previously, a large number of different compounds such as phenolic antioxidants, e.g., p-phenylphenol, N-stearoyl-p-aminophenol and 2,2′-methylenebis(4-ethyl-6-tert-butylphenol), have been used as heat and light stabilizers for polyphenylene ether compositions. These stabilizers have been generally unsatisfactory for even short exposure to heat. Other stabilizers such as the ketones, benzoic anhydride and mercaptobenzimidazoles have also been proposed and have been found to be effective for short periods of exposure to heat, but not for the relatively long exposures required for many commercial uses.

In Zuccaro, U.S. Pat. 3,420,792, it is disclosed that the addition of a small amount of a hexaalkylphosphoric triamide is very effective to stabilize polyphenylene ethers, the amounts used ranging between about 0.01 and 10 parts by weight per 100 parts by weight of the resin. The hexaalkylphosphoric triamides are represented by Formula III:

(III)

wherein $R^{11}$, $R^{12}$ and $R^{13}$ are alkyl of from 1 to 6 carbon atoms, e.g., straight chain or branched, methyl, ethyl, propyl, i-propyl, butyl, hexyl and the like. The hexaalkylphosphoric triamides can be made in known ways, e.g., by reaction of a secondary amine with phosphorus oxychloride. Suitable such compounds are hexamethylphosphoric triamide, hexaethylphosphoric triamide, tris(methylethyl)phosphoric amide, hexa(hexyl)phosphoric triamide, and the like. The preferred embodiment is hexamethylphosphoric triamide.

It has now been discovered that if certain other compounds containing a phosphorus-nitrogen bond are substituted for hexaalkylphosphoric triamides, or, if certain boron containing compounds are added to the compounds substituted for hexaalkylphosphoric triamides, stabilizing systems with very high efficiency are obtained. In particular, such novel stabilizers used in combination with a thermoplastic resin having a polyphenylene ether component result in a composition having a much greater stability to heat and light as emplified by increase in time to embrittlement of at least 100% as compared to a polyphenylene ether containing no additives. Moreover, in many cases the time to embrittlement is extended beyond what would be obtained with polyphenylene ethers stability to heat and light as exemplified by increase in phosphoric triamide. In addition to the increase in flex life, such compositions also provide economic advantages not possible with the prior art stabilizing systems.

DESCRIPTION OF THE INVENTION

According to this invention there are provided stabilized compositions comprising a major amount of a thermoplastic resin having a normally unstable polyphenylene ether component and a stabilizing amount of a stabilizer comprising an N,N,N',N'-tetra-substituted arylphosphonic diamide or a mixture thereof with a minor proportion of a boron compound.

According to a preferred feature of the invention, the N,N,N',N'-tetra-substituted aryl phosphonic diamide will be of Formula IV:

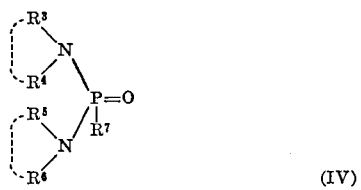

(IV)

wherein $R^3$ and $R^4$ and $R^5$ and $R^6$ are, independently, alkyl of 1 to 12 carbon atoms or, taken together are

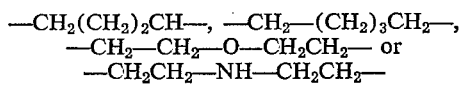

and $R^7$ is mono- or di-carbocyclic aryl of from 6 to 12 carbon atoms.

The compounds of Formula IV can be prepared in known ways, e.g., by the reaction of an arylphosphinic acid dihalide with a suitably substituted secondary amine. Such methods will be exemplified in detail hereinafter. Illustrative of the compounds of Formula IV suitable for use in this invention are:

N,N,N',N'-tetramethylphenylphosphinic diamide;
N,N,N',N'-tetraethylphenylphosphonic diamide;
N,N-dimorpholinophenylphosphonic diamide;
N,N-dipiperidinophenylphosphonic diamide;
N,N'-dimethyl-N,N'-dioctyl phenylphosphonic diamide;
N,N,N',N'-tetramethyl-p-methylphenylphosphonic diamide;
N,N,N',N'-tetramethyl-alpha-naphthylphosphonic diamide, and the like. Preferred compounds of Formula IV are N,N,N',N' - tetramethylphenylphosphonic diamide; dimorpholinophenyl phosphonic diamide or N,N'-dimethyl-N,N'-dioctylphenyl phosphonic diamide.

The boron compounds used as optional components are the above stabilizer compositions which can vary widely, and will include both organic and inorganic boron compounds. Illustrative of the most useful are:

(a) boron oxide, $B_2O_3$;
(b) a boronic acid of the formula

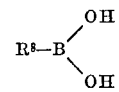

wherein $R^8$ is hydrogen, alkyl of from 1 to 5 carbon atoms or monocyclic aryl;
(c) a trialkyl borate of the formula $(R^9O)_3B$ wherein $R^9$ is alkyl of from 1 to 15 carbon atoms or
(d) boric acid, $H_3BO_3$.

Illustrative boron acids are boric acid, boronic acid, methylboronic acid, ethylboronic acid, butylboronic acid, hexylboronic acid, phenylboronic acid, methylphenylboronic acid, xylylboronic acid, 2,2'-dimethylheptylboronic acid, 2-methyl-3-ethyloctylboronic acid and the like. Illustrative alkyl borates are trimethylborate, triethyl borate, triisopropyl borate, tri-2-ethylhexyl borate, and the like.

With respect to the systems containing only the tetraalkyl arylphosphonic diamide, alone, as stabilizer the amount to be added depends on its activity, the quality of the resin to be stabilized and the conditions to which the resin composition is to be exposed. The stabilizer may be added in an amount of between about 0.1 and about 10 parts by weight per 100 parts by weight of the resin, and preferably in an amount of between 1 and 8 parts by weight per 100 parts by weight of the resin.

With respect to stabilizer combinations with the boron compound, in general, the useful and preferred ranges of amount will be as above-stated. The tetraalkylphenylphosphonic diamide should be added in an amount at least equal to the remaining components in the stabilizer combination and preferably in an amount equivalent to at least 1.5 times the remaining ingredients in the stabilizer portion of the composition. In preferred such embodiments the tetraalkylarylphosphonic diamide compound is present in an amount ranging from 1 to 3 parts by weight, and the boron compound in an amount ranging between 1 and 2 parts by weight per 100 parts by weight of the resin.

The manner of adding the stabilizer to the thermoplastic resin composition containing a polyphenylene ether component is not critical to this invention. Hence, any convenient method can be employed. For example, the stabilizer composition can be blended with the powdered thermoplastic resin composition in a blender, e.g., a Waring-type blender. Alternatively, the resin can be dissolved in a suitable solvent and the stabilizer added to the solution. The stabilized composition can then be recovered, e.g., by precipitation, or by evaporation of the solvent.

The stabilized compositions of this invention are useful for all purposes for which polyphenylene ether compositions have heretofore been used, see, for example, the above-mentioned patents of Hay and Cizek. The stabilized compositions may, for example, be converted to films, fibers, molded articles and the like by conventional methods.

The following procedures illustrate the preparation of several tetraalkylarylphosphonic acids useful in this invention.

Procedure A

N,N,N',N'-tetramethyl phenylphosphonic diamide is prepared by reacting 97.5 g. (0.5 mole) of distilled phenylphosphonic acid dichloride with 90 g. (2.0 moles) of dimethylamine dissolved in 1000 ml. of diethylether. The reaction mixture is maintained between −10° and +5° C. during the addition of the acid chloride to the amine solution. After standing for about 16 hours, the mixture is heated under reflux for 30 minutes then filtered to remove dimethylamine hydrochloride. The product crystallizes from the ether solution on cooling, M.P. 84–87° C. The yield is 56 g. (52.8%).

Procedure B

N,N'-dimorpholino phenylphosphonic diamide is prepared by adding 58.5 g. (0.3 mole) of phenylphosphonic acid dichloride to 105 g. (1.2 moles) of morpholine dissolved in 700 ml. of heptane. The temperature of the reaction mixture is maintained between 30° and 50° C. during the addition. The mixture is stirred with heating under reflux for 30 minutes, then filtered while still hot to remove morpholine hydrochloride. The product, M.P. 100–101° C., crystallizes from the heptane solution on cooling to room temperature. There is obtained 52 g. (58.5%) yield.

Procedure C

N,N'-dimethyl-N,N'-dioctyl phenylphosphonic diamide is prepared by the addition of 9.7 g. (0.05 mole) of phenylphosphonic acid dichloride to 28.6 g. (0.2 mole) of methyl-n-octylamine dissolved in 200 ml. of ligroin (B.P. 35–60° C.). After standing at about 23° C. for 48 hours, the mixture is filtered to remove precipitated amine hydrochloride (18 g.). Evaporation of the mother liquor affords the crude product, an oil. The oil is heated under vacuum (0.5 mm. Hg.) to 210° C. to remove unreacted amine and residual solvent. The yield of residual oil (product) is 17.7 g. (86.7%).

DESCRIPTION OF THE PREFERRED EMBODIMENTS

The following examples serve to illustrate the invention but are not intended to be limiting. Amounts specified in parts are parts by weight.

The following general Procedure D illustrates a process for the formation of a composition including a polyphenylene ether containing stabilizers according to this invention. In addition, it describes the method for evaluating the stabilized compositions and for comparing them with control samples, which omit certain of the stabilizing components.

Procedure D

Resin, in powdered form, and the selected stabilizer are blended together in a Waring Blender for from 1 to 2 minutes. The mixture is then fed to an extruder and extruded at 500–600° F. (for polyphenylene ether alone) or at 425–500° F. (for polyphenylene ether blended with a polystyrene resin). The extruded strands are chopped into pellets. Two gram samples of the pellets are molded into specimen films by preheating at 500° F. and thereafter molding at a pressure of 20,000 p.s.i. at a temperature of 550° F. for 1 minute. The films so prepared have a thickness of about 10 mils. They are cut into strip specimens, measuring 4" x ½" and placed in an air circulating oven, maintained at an elevated temperature. The time to embrittle is measured for each of the specimens by folding the films at various times during the heat aging process until the film strip embrittles to a point where it snaps when partially folded. This time is defined as the time to embrittle.

EXAMPLES 1 and 2

The polyphenylene ether used in these examples is poly-(2,6-dimethyl-1,4-phenylene)ether, prepared by the procedure of the Hay patents, mentioned hereinabove, and having an intrinsic viscosity of 0.53 deciliter/gram, measured in chloroform at 30° C. Heat aging is conducted at 175° C. The stabilized compositions and times to embrittle are set out in Table 1:

TABLE 1

Polyphenylene ether composition stabilized with N,N,N',N'-tetramethylphenylphosphonic diamide

| Example | Composition | Parts | Time to embrittle (hrs.) |
|---|---|---|---|
| 1-C | Poly(2,6-dimethyl-1,4-phenylene ether-control (no additive). | 100 | 30 |
| 1 | Poly(2,6-dimethyl-1,4-phenylene) ether. | 100 | |
|  | N,N,N',N'-tetramethylphenylphosphonic diamide. | 2 | 72 |
| 2 | Poly(2,6-dimethyl-1,4-phenylene) ether. | 100 | |
|  | N,N,N',N'-tetramethylphenylphosphonic diamide. | 2 | |
|  | Boron oxide | 1 | 165 |

The procedure is repeated, substituting for the boron oxide, boric acid and triethyl borate. The procedure is repeated, substituting for the N,N,N',N'-tetramethylphenylphosphonic diamide, N,N,N',N' - tetramethyl-4-methylphenylphosphonic diamide. Stabilized compositions according to this invention are obtained.

EXAMPLE 3

The polyphenylene ether used in this Example is poly-(2,6-dimethyl-1,4-phenylene)ether. Heat aging is conducted at 175° C. The stabilized compositions and times to embrittle are set out in Table 2.

TABLE 2

Polyphenylene ether composition stabilized with dimorpholinophenylphosphonic diamide

| Example | Composition | Parts | Time to embrittle (hrs.) |
|---|---|---|---|
| 2-C | Poly(2,6-dimethyl-1,4-phenylene) ether. | 100 | 30 |
| 2 | do | 100 | |
|  | Dimorpholinophenylphosphonic diamide. | 2 | 96 |

The procedure is repeated, substituting for the dimorpholinophenylphosphonic acid, dipyrrolidinophenylphosphonic diamide, dipiperidinophenylphosphonic diamide and di-1,4-piperazinophenylphosphonic diamide. Stabilized compositions according to this invention are obtained.

EXAMPLES 4 and 5

The polyphenylene ether used in these examples is poly-(2,6-dimethyl-1,4-phenylene)ether. Heat aging is conducted at 175° C. The stabilized compositions and times to embrittle are set out in Table 3.

TABLE 3

Polyphenylene ether compositions stabilized with N,N'-dimethyl-N,N'-dioctylphenylphosphonic diamide

| Example | Composition | Parts | Time to embrittle (hrs.) |
|---|---|---|---|
| 4-C | Poly(2,6-dimethyl-1,4-phenylene) ether. | 100 | 30 |
| 4 | do | 100 | |
|  | N,N'-dimethyl-N,N'-doctylphenylphosphonic diamine. | 2 | 60 |
| 5 | Poly(2,6-dimethyl-1,4-phenylene) ether. | 100 | |
|  | N,N'-dimethyl-N,N'-dioctylphenylphosphonic diamide. | 2 | |
|  | Boron oxide | 1 | 80 |

The procedures outlined above are repeated, substituting the following for poly(2,6-dimethyl-1,4-phenylene) ether:

poly(2,6-diethyl-1,4-phenylene)ether,
poly(2-methyl-6-ethyl-1,4-phenylene)ether,
poly(2-methyl-6-propyl-1,4-phenylene)ether,
poly(2,6-dipropyl-1,4-phenylene)ether, and
poly(2,6-diphenyl-1,4-phenylene)ether.

Stabilized compositions according to this invention are obtained.

The procedures outlined above are repeated, substituting for the poly(2,6-dimethyl-1,4-phenylene)ether, the following thermoplastic resin compositions (Cizek, U.S. 3,383,435):

| Compositions: | Parts |
|---|---|
| Poly(2,6-dimethyl-1,4-phenylene)ether | 50 |
| Homopolystyrene | 50 |
| Poly(2,6-dimethyl-1,4-phenylene)ether | 50 |
| High impact rubber modified polystyrene (10% by weight polybutadiene) | 50 |
| Poly(2,6-dimethyl-1,4-phenylene)ether | 50 |
| Poly(alpha-methyl styrene) | 50 |
| Poly(2,6-dimethyl-1,4-phenylene)ether | 50 |
| Styrene-acrylonitrile copolymer (27% ACN) | 50 |

Stabilized compositions according to this invention are obtained.

Other modifications and variations of the present invention are possible in light of the above teachings. The compositions may also include various fillers, reinforcements, i.e., fibrous glass, modifying agents, dyes, pigments, plasticizers and the like. It is therefore to be understood that changes may be made in the particular embodiments of the invention described and these will be within the full intended scope of the invention as defined by the appended claims.

We claim:

1. A stabilized composition comprising a major amount of a thermoplastic resin having a normally unstable polyphenylene ether and a stabilizing amount of a stabilizer comprising an N, N, N', N'-tetra-substituted arylphosphonic diamide of the formula

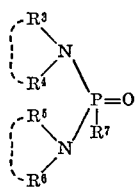

wherein $R^3$ and $R^4$ and $R^5$ and $R^6$ are, independently, alkyl of 1 to 6 carbon atoms or, taken together, are —CH$_2$(CH$_2$)$_2$CH$_2$—, —CH$_2$(CH$_2$)$_3$CH$_2$,

—CH$_2$CH$_2$—O—CH$_2$CH$_2$— or —CH$_2$CH$_2$—NH—CH$_2$—CH$_2$; and $R^7$ is mono or dicarbocyclic aryl of from 6 to 12 carbon atoms or a mixture thereof with a minor proportion of a boron compound.

2. A composition as defined in claim 1 wherein said diamide is tetramethyl phenylphosphonic diamide; dimorpholino phenylphosphonic diamide or N,N'-dimethyl-N,N'-dioctyl phenylphosphonic diamide.

3. A composition as defined in claim 1 wherein said boron compound is selected from
   (a) boron oxide,
   (b) a boronic acid of the formula

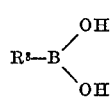

wherein $R^8$ is hydrogen, alkyl of from 1 to 15 carbon atoms or monocyclic aryl,
   (c) a trialkyl borate of the formula $(R^9O)_3B$ wherein $R^9$ is alkyl from 1 to 15 carbon atoms, or
   (d) boric acid, $H_3BO_3$.

4. A composition as defined in claim 1 wherein the polyphenylene ether is of the formula

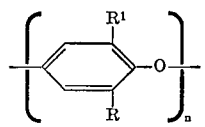

wherein R and $R^1$ are monovalent substituents selected from the group consisting of hydrogen, halogen, hydrocarbon radicals, halo-hydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and $n$ is a whole integer of at least 50.

5. A composition as defined in claim 4 wherein R and $R^1$ are each methyl.

6. A composition as defined in claim 1 wherein said thermoplastic resin composition includes a polystyrene resin component.

7. A composition as defined in claim 6 wherein said thermoplastic resin composition contains from about 20 to about 80 parts by weight of said polyphenylene ether and from about 80 to about 20 parts by weight of said polystyrene resin.

8. A composition as defined in claim 6 wherein said polystyrene resin has at least 25% by weight of the repeating units derived from a monomer having the formula:

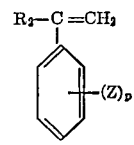

wherein $R^2$ is hydrogen, (lower)alkyl or halogen, Z is vinyl, halogen or (lower)alkyl; and $p$ is 0 or a whole number of from 1 to 5.

9. A composition as defined in claim 6 wherein said polystyrene resin is homopolystyrene.

10. A composition as defined in claim 6 wherein said polystyrene resin is a rubber modified high impact polystyrene.

11. A stabilized composition as defined in claim 1 wherein the stabilizer constitutes from about 1.0 to about 10.0 parts by weight per 100 parts by weight of said resin.

12. A composition as defined in claim 5 wherein said stabilizer is N,N,N',N'-tetramethylphenylphosphonic diamide.

13. A composition as defined in claim 12 wherein said stabilizer includes a minor proportion of boron oxide.

14. A composition as defined in claim 5 wherein said stabilizer is dimorpholinophenylphosphonic diamide.

15. A composition as defined in claim 5 wherein said stabilizer is N,N'-dimethyl-N,N'-dioctylphenylphosphonic diamide.

16. A composition as defined in claim 15 wherein said stabilizer includes a minor proportion of boron oxide.

17. A stabilized composition comprising a major amount of a thermoplastic resin including a normally unstable polyphenylene ether of the formula

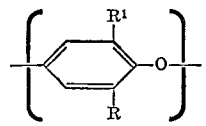

wherein R and $R^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and n is a whole integer of at least 50 and a stabilizing amount of a stabilizer comprising a N,N,N',N'-tetrasubstituted arylphosphonamide of the formula

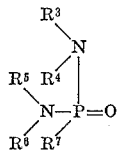

wherein $R^3$ and $R^4$ and $R^5$ and $R^6$ are, independently, alkyl of 1 to 6 carbon atoms or, taken together are
—CH$_2$(CH$_2$)$_2$CH$_2$—
CH$_2$(CH$_2$)$_3$—CH$_2$—, —CH$_2$—CH$_2$—O—CH$_2$— or —CH$_2$—CH$_2$—NH—CH$_2$—CH$_2$—; and R7 is phenyl or naphthyl; or a mixture thereof with a minor proportion of a boron compound selected from the group consisting of (a) boron oxide, (b) a boronic acid of the formula

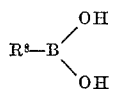

wherein $R^8$ is hydrogen, alkyl of from 1 to 15 carbon atoms or monocyclic aryl, (c) a trialkyl borate of the formula $(R^9O)_3B$ wherein $R^9$ is alkyl from 1 to 15 carbon atoms, and (d) boric acid.

References Cited
UNITED STATES PATENTS

| | | | |
|---|---|---|---|
| 3,100,197 | 8/1963 | Hewck et al. | 260—45.9 R |
| 3,383,435 | 5/1968 | Cizek | 260—874 |
| 3,453,231 | 7/1969 | Bussink et al. | 260—45.9 R |

JOHN C. BLEUTGE, Primary Examiner

J. ZIEGLER, Assistant Examiner

U.S. Cl. X.R.

260—45.9 P, 876 R, 878 R, 879, 881, 886